United States Patent [19]

Nagashima

[11] Patent Number: 5,664,071

[45] Date of Patent: Sep. 2, 1997

[54] GRAPHICS PLOTTING APPARATUS AND METHOD

[75] Inventor: Ichiro Nagashima, Kanagawa-ken, Japan

[73] Assignee: Kabushiki Kaisha Toshiba, Kawasaki, Japan

[21] Appl. No.: 356,736

[22] Filed: Dec. 15, 1994

[30] Foreign Application Priority Data

Dec. 21, 1993 [JP] Japan ................................. 5-322853

[51] Int. Cl.$^6$ .......................... G06K 15/00; G06F 15/00
[52] U.S. Cl. ........................................ 395/103; 395/423
[58] Field of Search .................................. 395/109, 101, 395/103, 123, 128, 124, 125, 141, 139, 127; 364/518

[56] References Cited

U.S. PATENT DOCUMENTS

| | | | |
|---|---|---|---|
| 3,889,107 | 6/1975 | Sutherland | 395/123 |
| 4,620,287 | 10/1986 | Yam | 364/518 |
| 4,974,177 | 11/1990 | Nishiguchi | 364/522 |
| 5,163,127 | 11/1992 | Ikumi et al. | 395/126 |
| 5,276,783 | 1/1994 | Fossum | 395/123 |
| 5,335,319 | 8/1994 | Obata | 395/141 |
| 5,408,598 | 4/1995 | Pryor, Jr. | 395/142 |

FOREIGN PATENT DOCUMENTS

| | | |
|---|---|---|
| 0 262 619 | 4/1988 | European Pat. Off. . |
| 0 366 463 | 5/1990 | European Pat. Off. . |
| 0 456 408 | 11/1991 | European Pat. Off. . |

OTHER PUBLICATIONS

Foley et al., "Computer Graphics, Principles and Practice," 2nd edition, 1990, pp. 810–813 and pp. 1122–1123.

Cook et al., "The Reyes Image Rendering Architecture," *Computer Graphics*, vol. 21, No. 4, Jul. 1987, pp. 95–102.

*Primary Examiner*—Dwayne Bost
*Assistant Examiner*—Tracy M. Legree
*Attorney, Agent, or Firm*—Foley & Lardner

[57] ABSTRACT

A graphics plotting apparatus has a decision unit for determining whether or not a polygon is smaller than a predetermined size, for example, the size of a pixel on a display screen or the size of a pixel on a texture pattern according to data of the vertexes of the polygon, a divider for dividing the polygon into small polygons if the polygon is not smaller than the predetermined size, and a plotting unit for plotting pixels corresponding to the polygon if the polygon is smaller than the predetermined size. This apparatus is capable of plotting perspective three-dimensional graphics with smooth shading and texture mapping at a high speed in real time.

6 Claims, 5 Drawing Sheets

GRAPHICS PLOTTING APPARATUS AND METHOD

BACKGROUND OF THE INVENTION

1. Field of the Invention

The present invention relates to a graphics plotting apparatus for plotting three-dimensional computer graphics with smooth-shading and texture-mapping, and particularly, to a graphics plotting apparatus and a graphics plotting method capable of easily plotting a perspective image in which things far away are seen smaller.

2. Description of the Prior Art

A three-dimensional graphics plotting apparatus changes the coordinates of a three-dimensional image to those of a two-dimensional image and prepares data of the vertexes of the two-dimensional image. The apparatus calculates the luminance and depth of each pixel contained in a polygon defined by the vertexes, and writes the luminance and depth to an image memory at locations corresponding to the pixels.

Figure 1A:
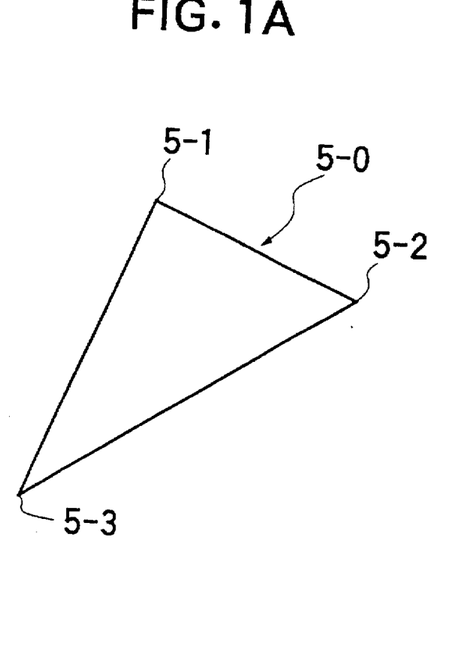
FIGS. 1(A) to 1(D) explain graphics plotting processes according to a prior art.
Figure 1B:
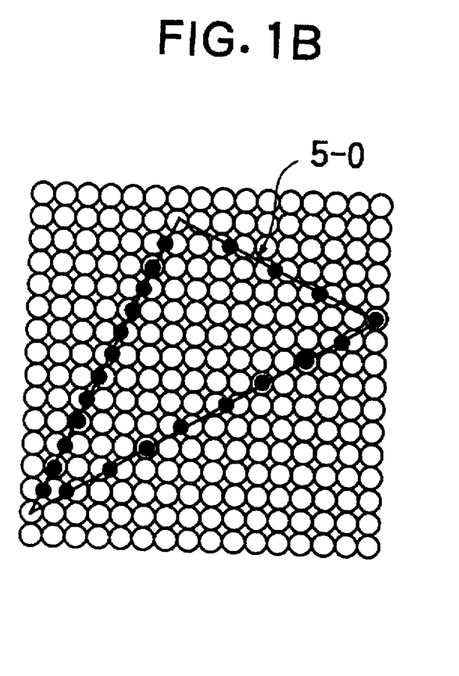
Figure 1C:
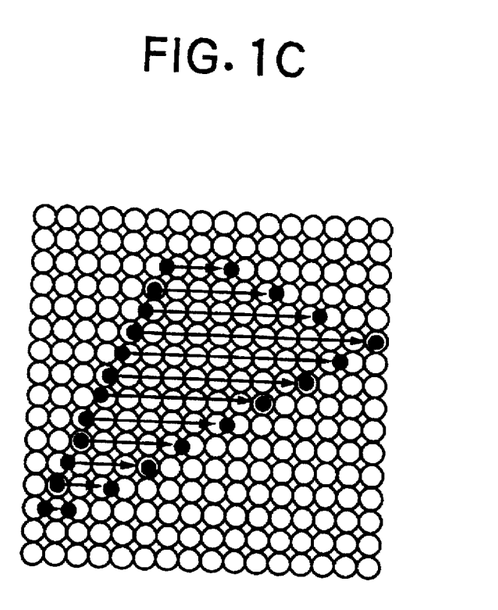
Figure 1D:
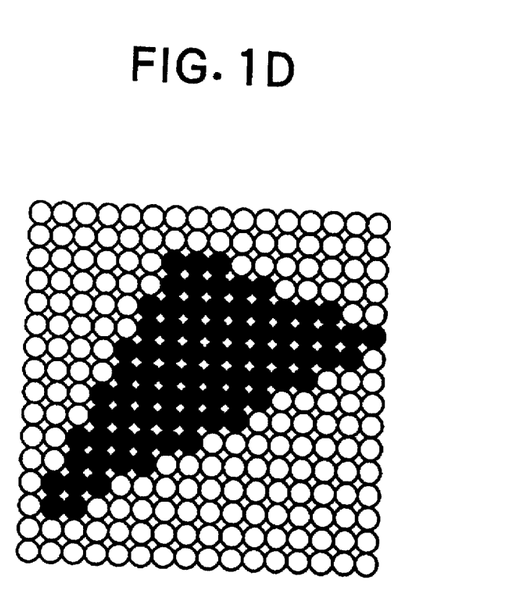

FIGS. 1(A) to 1(D) show processes of changing the coordinates of a three-dimensional image to those of a two-dimensional triangle, preparing data of the vertexes of the triangle, and mapping the vertex data in an image memory. In FIG. 1(A), the transformed two-dimensional triangle 5-0 has vertexes 5-1, 5-2, and 5-3. In FIG. 1(B), the luminance, depth, and two-dimensional position of each edge point of the triangle 5-0 are calculated and interpolated. In FIG. 1(C), the edge points are linearly interpolated along horizontal scan lines, and the luminance and depth of each pixel contained in the triangle 5-0 are calculated. In FIG. 1(D), the luminance and depth of each pixel are written to the image memory at locations corresponding to the pixels.

When an image on a three-dimensional coordinate system is perspectively projected to a surface, deep parts of the image become smaller. When the projected image is linearly interpolated, the luminance and depth of each pixel thus obtained differ from those obtained by interpolating the original three-dimensional image. The difference is particularly conspicuous when texture mapping is carried out to plot a two-dimensional image according to a three-dimensional image. It is difficult to plot a perspective polygon by linear interpolation. When carrying out texture mapping to form a perspective image, it is necessary to inversely change each pixel or a small number of pixels from a projection surface to a three-dimensional coordinate system. Alternatively, it is necessary to divide a polygon on a three-dimensional coordinate system into small polygons so that a projected image may not be influenced by perspective. These measures, however, require an enormous amount of divisional calculations, and therefore, are improper for real-time animations. When carrying out smooth shading with a DDA (digital differential analyzer), the conventional plotting apparatus must preprocess difference values. This involves a large number of calculations.

SUMMARY OF THE INVENTION

An object of the present invention is to provide a graphics plotting apparatus and a graphics plotting method capable of plotting three-dimensional graphics having perspective, smooth shading, and texture mapping effects in real time with a minimum number of calculations.

Figure 2:
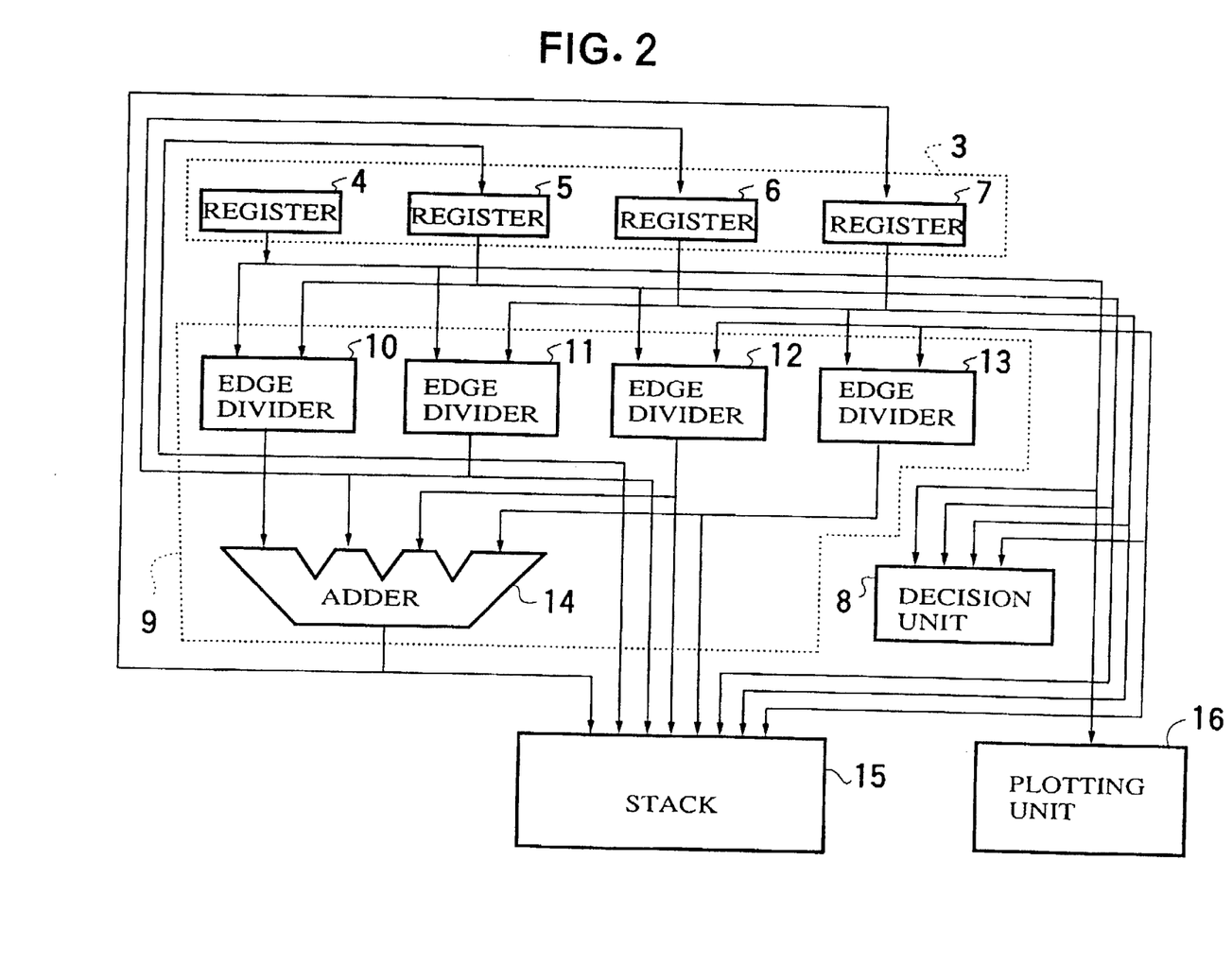
FIG. 2 shows essential part of a graphics plotting apparatus according to the present invention.

In order to accomplish the object, a first aspect of the present invention provides a graphics plotting apparatus shown in FIG. 2. This apparatus includes a polygon memory 3 having registers 4, 5, 6, and 7 for storing data of the vertexes of an objective three-dimensional polygon, a stack 15 for holding data of the vertexes of polygons, a decision unit B for determining whether or not the objective polygon stored in the memory 3 is smaller than a predetermined size, a divider 9 for dividing, if the objective polygon is not smaller than the predetermined size, the objective polygon into small polygons and writing the vertex data of one of the small polygons to the registers of the memory 3 and the vertex data of the other small polygons to the stack is, and a plotting unit 18 for writing, if the objective polygon is smaller than the predetermined size, pixels corresponding to the objective polygon to an image memory. The predetermined size to be compared with an objective polygon may be the size of a pixel or of a plurality of pixels on a display screen or on a texture pattern.

Figure 5:
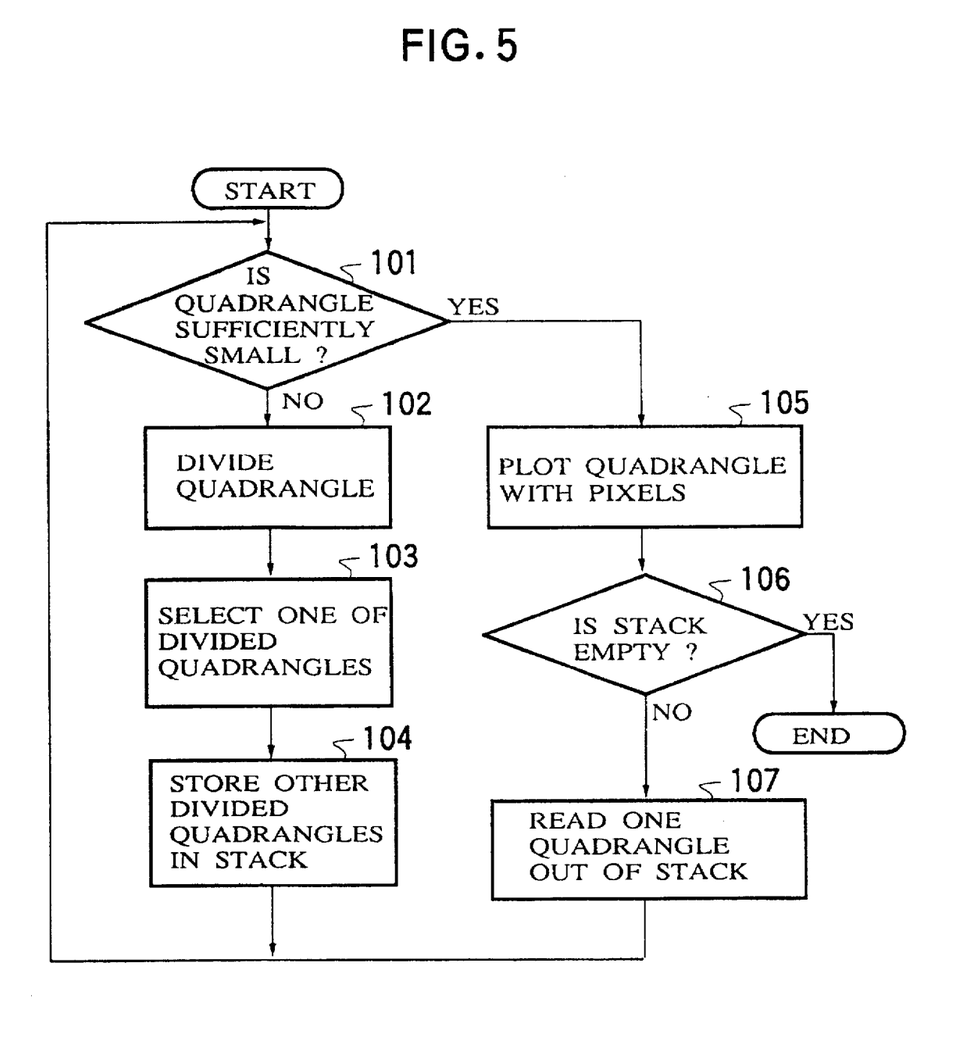
FIG. 5 is a flowchart showing essential steps according to a graphics plotting method of the present invention applied to the apparatus of FIG. 2.

A second aspect of the present invention provides a graphics plotting method shown in a flowchart of FIG. 5. This method is achieved by the graphics plotting apparatus of the first aspect of the present invention. The method includes a step in which the decision unit 8 determines whether or not a polygon whose vertex data are stored in the registers 4 to 7 of the polygon memory 3 is sufficiently small or not, a step of dividing the polygon into small polygons if the polygon is not sufficiently small and writing the vertex data of one of the small polygons to the registers of the memory 3 and the vertex data of the other small polygons to the stack 15, and a step of writing, with the plotting unit 16, pixels corresponding to the polygon to the image memory to plot the polygon if the polygon is sufficiently small, reading the vertex data of another polygon out of the stack 15, and writing the read data to the registers of the memory 3. The second aspect of the present invention recurrently repeats these steps until the stack 15 becomes empty. After completely dividing an original polygon into small polygons, the second aspect may average the luminance, depth, and texture pattern data of all regions in each pixel, calculate a pixel coverage ratio of the original polygon according to flags that represent written regions, and plot the polygon by mixing the luminance data and backgrounds. In this way, the second aspect of the present invention plots perspective graphics with smooth shading and texture mapping.

Other and further objects and features of this invention will become obvious upon an understanding of the illustrative embodiments about to be described in connection with the accompanying drawings or will indicated in the appended claims, and various advantages not referred to herein will occur to one skilled in the art upon employing of the invention in practice.

BRIEF DESCRIPTION OF THE DRAWINGS

FIG. 8 explains processes carried out by the graphics plotting apparatus of the present invention to plot a quadrangle on a two-dimensional surface;

DETAILED DESCRIPTION OF THE EMBODIMENTS

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

Figure 3:
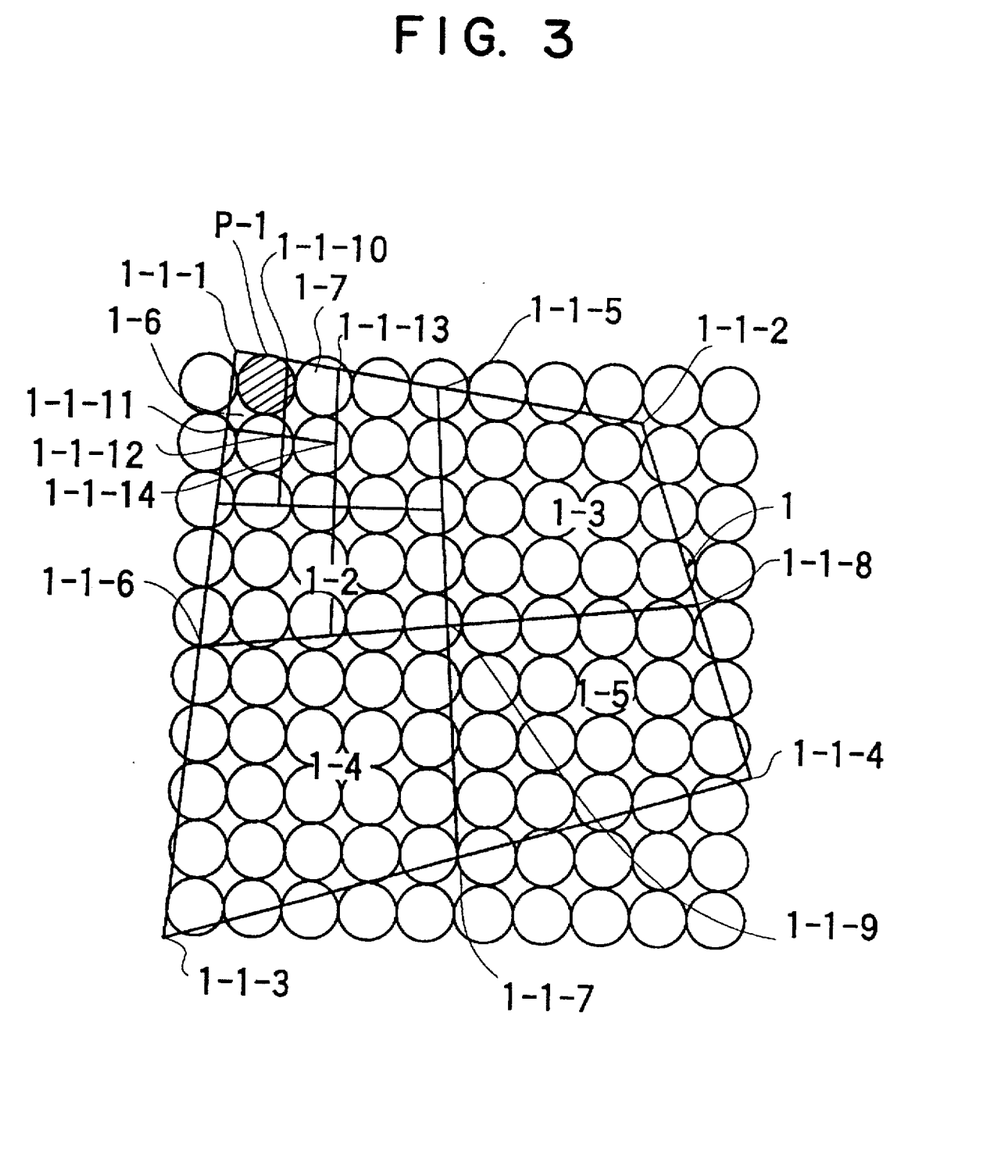

FIG. 2 shows an essential part of a graphics plotting apparatus according to a first embodiment of the present invention. In the following explanation, this apparatus processes, as an example, a quadrangle. The apparatus changes the three-dimensional coordinates of the quadrangle to two-dimensional coordinates as shown in FIG. 3 and plots pixels corresponding to the three-dimensional quadrangle according to the vertexes of the two-dimensional quadrangle of FIG. 3. A quadrangle memory 3 of the apparatus has registers 4, 5, 6, and 7 each storing data of one of the vertexes of an objective quadrangle to be processed. A decision unit 8 is connected to the memory 3 and determines the size of the quadrangle. The decision unit 8 includes comparators or subtraction devices. A divider 9 is connected to the memory 3 and divides the quadrangle into small quadrangles. A stack 15 is connected to the divider 9, memory 3, and decision unit 8 and temporarily stores the divided small quadrangles. A plotting unit 16 is connected to the memory 3 and maps pixels corresponding to the quadrangle on an image memory (not shown). The registers 4 to 7 of the memory 3 store the horizontal, vertical, depth, and luminance data of the first to fourth vertexes of the quadrangle as well as the horizontal and vertical positions of a corresponding texture pattern. The decision unit 8 determines whether or not the quadrangle is substantially equal to the size of a pixel on a display screen according to the horizontal and vertical data of the four vertexes stored in the memory 3. Namely, the decision unit 8 determines whether or not the second, third, and fourth vertexes are each within a pixel width from the first vertex.

If the quadrangle is larger than a pixel, the divider 9 divides the quadrangle into small quadrangles by creating five points. Namely, edge dividers 10, 11, 12, and 13 divide an edge between the first and second vertexes, an edge between the first and third vertexes, an edge between the second and fourth vertexes, and an edge between the third and fourth vertexes according to the ratio of the depth of one end point to the depth of the other end point of each edge, to provide first to fourth division points. Thereafter, the horizontal and vertical coordinates of the four division points are calculated. At the same time, the depth and luminance data of each of the division points as well as the horizontal and vertical positions of corresponding texture patterns are calculated by simply averaging data of the end points of each edge. Dividing each edge according to the end-point depth ratio involves division calculations. These calculations are carried out by approximations, to save time. An adder 14 simply averages the horizontal, vertical, depth, and luminance data of the four division points as well as the horizontal and vertical positions of the corresponding texture patterns calculated by the edge dividers 10 to 13, to provide data for a fifth division point.

More precisely, when plotting the projected quadrangle 1 of FIG. 3 on a two-dimensional display screen, the quadrangle 1 is divided into small quadrangles 1-2, 1-3, 1-4, and 1-5 according to division points 1-1-5, 1-1-8, 1-1-7, and 1-1-8 and the intersection of a segment connecting the division points 1-1-5 and 1-1-7 and a segment connecting the division points 1-1-6 and 1-1-8. Data of four points 1-1-9, 1-1-8, 1-1-7, and 1-1-4 defining the small quadrangle 1-5, data of the four points 1-1-8, 1-1-9, 1-1-3, and 1-1-7 defining the small quadrangle 1-4, and data of the four points 1-1-5, 1-1-2, 1-1-9, and 1-1-8 defining the small quadrangle 1-3 are stored in the stack 15. The decision unit 8 determines whether or not the small quadrangle 1-2 defined by the four points 1-1-1, 1-1-5, 1-1-6, and 1-1-9 is smaller than the size of a pixel on the display screen. If it is not smaller, the small quadrangle 1-2 is again divided into four small quadrangles, and three of them are stored in the stack 15. These processes are repeated until a quadrangle 1-6 is obtained. According to four points 1-1-1, 1-1-10, 1-1-11, and 1-1-12 that define the quadrangle 1-6, it is determined whether or not the quadrangle 1-6 is smaller than a pixel. If the quadrangle 1-6 is smaller than a pixel, a pixel P-1 corresponding to the quadrangle 1-6 is written to the image memory according to the data of the four points. Then, the pixel P-1 is plotted. Thereafter, data of four points 1-1-10, 1-1-13, 1-1-12, and 1-1-14 defining a quadrangle 1-7 are read out of the stack 15, and the decision, division, and stacking processes mentioned above are carried out. These processes are recurrently carried out until the stack 15 becomes empty. Obtained data are written to the image memory, and pixels corresponding to the quadrangle 1 are displayed on the screen. When the quadrangle 1 is divided into small quadrangles, the five division points 1-1-5, 1-1-6, 1-1-7, 1-1-8, and 1-1-9 are created. At this time, the depth and luminance of the division point 1-1-5 and the position of a corresponding two-dimensional pattern are determined by averaging the related data of the vertexes 1-1-1 and 1-1-2, those of the point 1-1-6 are determined by averaging the related data of the vertexes 1-1-1 and 1-1-3, those of the point 1-1-7 are determined by averaging the related data of the vertexes 1-1-3 and 1-1-4, and those of the point 1-1-8 are determined by averaging the related data of the vertexes 1-1-2 and 1-1-4. Data of the fifth division point 1-1-9 are obtained by averaging the data of the vertexes 1-1-1, 1-1-2, 1-1-3, and 1-1-4 by the adder 14. These processes are repeated on other quadrangles, to determine the depth and luminance of each of four vertexes that define a quadrangle corresponding to a pixel, as well as determining the position of a two-dimensional pattern corresponding to the pixel.

Figure 4:
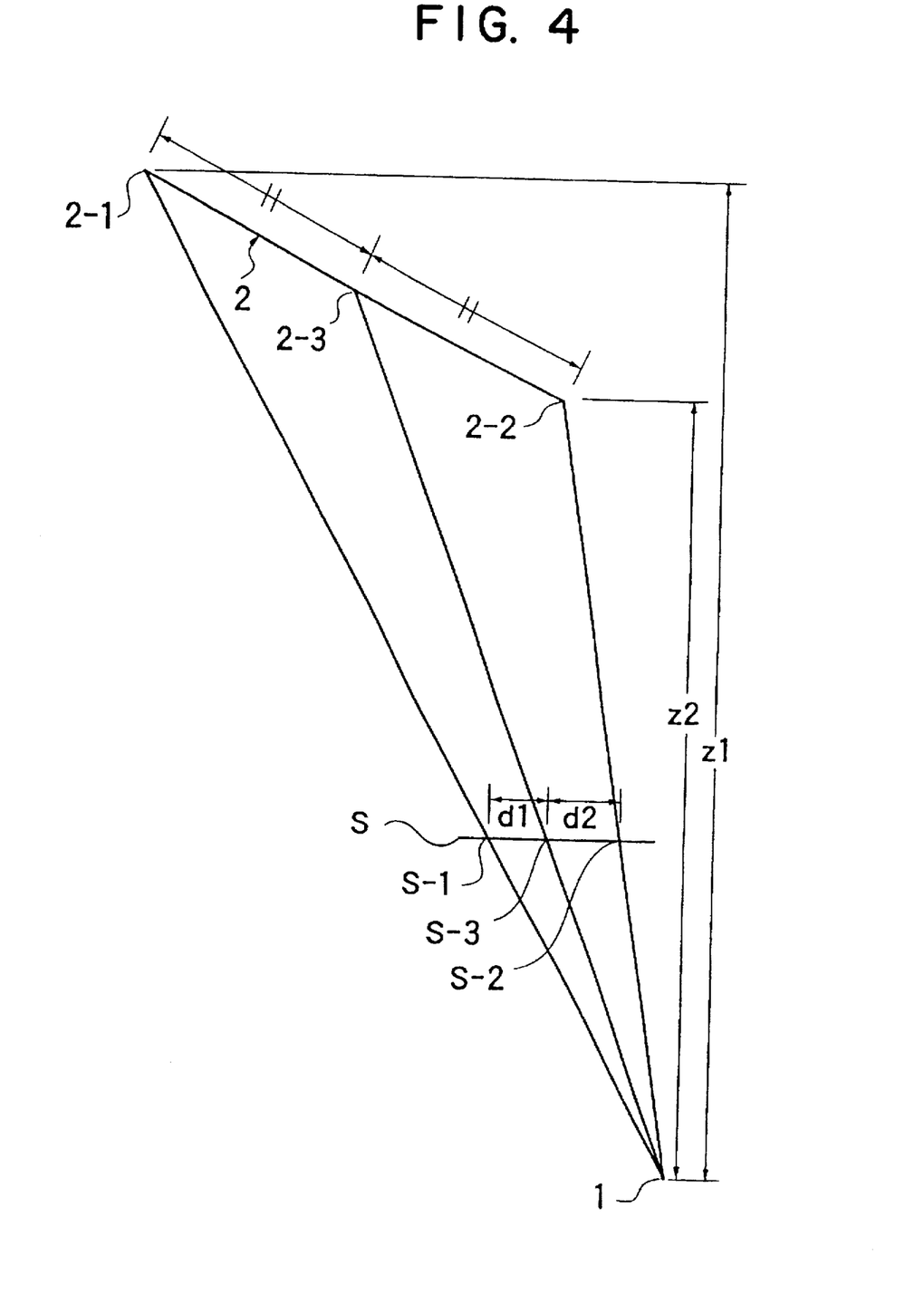
FIG. 4 explains processes carried out by the graphics plotting apparatus of the present invention to plot the edges of a polygon on a three-dimensional coordinate system.

The horizontal and vertical coordinates of each of first to fourth division points of a quadrangle are calculated by the edge dividers 10, 11, 12, and 13 that divide an edge according to the ratio of the depth of one end point to the depth of the other end point of the edge. In FIG. 4, an edge 2 of a polygon on a three-dimensional coordinate system is divided into two segments. The edge 2 has end points 2-1 and 2-2 that are projected onto a surface S and forms edges S-1 and S-2. A middle point 2-3 of the edge 2 forms a point S-3 on the surface S. The relationships of the points S-1, S-2, and S-3 are expressed as follows:

$$d1*z1 = d2*z2$$

where z1: depth from point of sight I to point 2-1 z2: depth from point of sight I to point 2-2 d1: distance between points S-3 and S-1 d2: distance between points S-3 and S-2

Consequently, a division point of 1:1 on the three-dimensional coordinate system is projected to a division point of z2:z1 on the projection surface. Namely, when an edge of a perspectively transformed polygon is divided according to the ratio of the depth of one end of the edge to the depth of the other end thereof, the division point corresponds to a middle point of an original edge. The depth and luminance of a division point on an edge and the position of a corresponding two-dimensional pattern are obtained by simply averaging related data of the end points of the edge.

The operation of the graphics plotting apparatus of FIG. 2 according to the present invention will be explained with reference to a flowchart of FIG. 5. In step 101, the decision unit 8 determines, according to data of the vertexes of an objective quadrangle, whether or not the quadrangle is smaller than a pixel on a display screen. If the quadrangle is greater than a pixel, the divider 9 divides the quadrangle into small quadrangles. One of the small quadrangles is selected as a new objective quadrangle, and the other small quadrangles are stored in the stack 15, in steps 102, 103, and 104.

More precisely, the stack 15 successively stores a quadrangle defined by a first vertex corresponding to a fifth division point provided by the adder 14, a second vertex corresponding to a third division point provided by the edge divider 12, a third vertex corresponding to a fourth division point provided by the edge divider 13, add a fourth vertex stored in the register 7, a quadrangle defined by a first vertex corresponding to a second division point provided by the edge divider 11, a second vertex corresponding to the fifth division point provided by the adder 14, a third vertex stored in the resister 6, and a fourth vertex corresponding to the fourth division point provided by the edge divider 13, and a quadrangle defined by a first vertex corresponding to a first division point provided by the edge divider 10, a second vertex stored in the register 5, a third vertex corresponding to the fifth division point provided by the adder 14, and a fourth vertex corresponding to the third division point provided by the edge divider 12. Thereafter, the contents of the registers 5, 6, and 7 are updated to store the first division point provided by the edge divider 10, the second division point provided by the edge divider 11, and the fifth division point provided by the adder 14. Consequently, the memory 3 stores a new objective quadrangle that is defined by a first vertex corresponding to the first vertex of the previous objective quadrangle, a second vertex corresponding to the first division point, a third vertex corresponding to the second division point, and a fourth vertex corresponding to the fifth division point. If the decision unit 8 determines in the step 101 that the objective quadrangle is smaller than a pixel, the plotting unit 16 writes, in step 105, a pixel corresponding to the objective quadrangle stored in the memory 3 to the image memory (not shown). The stored data items in the image memory will be displayed on the cathode ray tube (CRT) screen, Liquid Crystal Display (LCD) projectors, plasma panels, or another graphical display device. When a depth stored in the register 4 is in front of an original depth, a luminance value stored in the register 4 is multiplied by a value read according to the horizontal and vertical positions of a corresponding texture pattern stored in the register 4, to prepare a color, which is applied to a pixel specified by horizontal and vertical positions stored in the register 4. In step 107, one of the quadrangles stored in the stack 15 is read as an objective quadrangle, and the flow returns to the step 101. These steps are recurrently carried out. When the decision unit 8 determines that the objective quadrangle is smaller than a pixel, the plotting unit 16 writes a pixel corresponding to the objective quadrangle to the image memory. If the stack 15 is empty in step 106, the plotting of the original quadrangle is complete, and the display images stored in the image memory are represented by graphical display devices, such as CRT, LCD, plotter, or hard copy unit.

A graphics plotting apparatus according to a second embodiment of the present invention will be explained. This embodiment employs the same quadrangle memory, dividers, and stack as those of the first embodiment of FIG. 2. These parts store an objective quadrangle, divide the quadrangle into small quadrangles, and store the small quadrangles. According to the horizontal and vertical data of the four vertexes of an objective quadrangle stored in the memory 3, the decision unit 8 determines whether or not the quadrangle is smaller than the size of a predetermined number of pixels on a display screen. The decision unit may be a comparator or a subtraction device. Namely, the decision unit 8 determines whether or not the second, third, and fourth vertexes of the quadrangle are within a length corresponding to the predetermined number of pixels. When the quadrangle stored in the memory 3 is smaller than the size of the predetermined number of pixels, the plotting unit 16 writes pixels corresponding to the quadrangle to the image memory according to a known technique. Finally, the display images stored in the image memory are represented on the CRT screens, LCD projectors, Digital Mirror Device (DMD) projectors, or another display devices. The second embodiment is capable of reducing the number of divisions of an original quadrangle, to achieve a high-speed operation.

A graphics plotting apparatus according to a third embodiment of the present invention will be explained. This embodiment employs the same memory, dividers, and stack as those of the first embodiment of FIG. 2. These parts store an objective quadrangle, divide the quadrangle into small quadrangles, and store the small quadrangles. The decision unit 8 determines, according to the horizontal and vertical data of the four vertexes of an objective quadrangle stored in the memory 3, whether or not the quadrangle is equal to a region that is smaller than a pixel on a display screen. The region smaller than a pixel may be $\frac{1}{2}$, $\frac{1}{4}$, $\frac{1}{8}$, $\frac{1}{16}$, or else of the size of a pixel. Namely, the decision unit 8 determines whether or not the second, third, and fourth vertexes of the objective quadrangle are within the length of an edge of the region whose size is $\frac{1}{2}$, $\frac{1}{4}$, $\frac{1}{8}$, $\frac{1}{16}$, or else of a pixel from the first vertex of the objective quadrangle. If the quadrangle stored in the memory 3 is equal in size to the region that is smaller than a pixel, the plotting unit 18 holds the luminance, depth, and texture pattern of the corresponding region in the corresponding pixel, and sets a flag indicating that the region has been written. After the completion of divisions of the original quadrangle, the luminance, depth, and texture pattern data of regions contained in each pixel are averaged. The flags indicating whether or not corresponding regions have been written are checked to determine a pixel coverage ratio of the original quadrangle. Then, the luminance and backgrounds are mixed, to plot the quadrangle. The third embodiment improves accuracy in the luminance, depth, and corresponding texture pattern of each pixel. Also, the third embodiment removes jags on the edges of a quadrangle due to rasterization.

A fourth embodiment of the present invention will be explained. This embodiment employs the same memory, dividers, and stack as those of the first embodiment of FIG. 2. These parts store an objective quadrangle, divide the quadrangle into small quadrangles, and store the small quadrangles. The decision unit 8 involving a comparator or a subtraction device determines, according to the four vertexes of an objective quadrangle stored in the memory 3, whether or not the quadrangle is sufficiently small. Although the first to third embodiments make this decision according to the size of a pixel on a display screen, the fourth embodiment makes the same decision according to whether or not the second, third, and fourth vertexes of the objective quadrangle are within a pixel distance on a texture pattern from the first vertex of the quadrangle. If the quadrangle stored in the memory 3 is greater than a pixel on a texture pattern, the quadrangle is divided into small quadrangles in a similar manner to the first to third embodiments, and the luminance and depth of each pixel are calculated. If the quadrangle is smaller than a pixel, the luminance and depth of a corresponding pixel are calculated in a similar manner to the first to third embodiments, and the plotting unit 16 plots the pixel on the image memory. The fourth embodiment prevents sampling errors such as pattern losses during texture mapping.

Although the first to fourth embodiments have been explained with reference to quadrangles, the present invention is applicable to any other polygons. Although the embodiments have divided a quadrangle by four, it is possible to divide the same by 2, 8, 16, or else.

As explained above, the present invention plots a perspective image of a polygon by texture mapping in real time. The present invention applies perspective effect even on depth and luminance. The present invention more correctly interpolates an image on a projection surface than a simple linear interpolation technique. While the DDA required differences to be calculated before smooth shading, the graphics plotting apparatus and graphics plotting method according to the present invention are capable of plotting an image of a polygon only by setting data of the vertexes of the polygon.

Various modifications will become possible for those skilled in the art after receiving the teachings of the present disclosure without departing from the scope thereof.

What is claimed is:

1. A graphics plotting apparatus for writing a three-dimensional polygon defined by vertexes to an image memory to plot the polygon, comprising:
   (a) storing means having registers for storing data of the vertexes of the polygon;
   (b) stack means for storing data of the vertexes of polygons;
   (c) decision means for determining whether or not the polygon stored in the storage means is smaller than a predetermined size;
   (d) plotting means for writing pixels corresponding to the polygon to the image memory if said decision means determines that the polygon is smaller than the predetermined size; and
   (e) division means for dividing the polygon into small polygons if said decision means determines that the polygon is not smaller than the predetermined size, writing data of the vertexes of one of the small polygons to the registers of said storage means, and writing data of the vertexes of the other small polygons to said stack means,
   wherein the three-dimensional polygon is also defined by a depth of each vertex thereof, and said division means divides the polygon into small polygons according to a ratio of the depth of a vertex at one end to the depth of a vertex at the other end of each edge of the polygon.

2. A graphics plotting apparatus for writing a three-dimensional polygon defined by vertexes to an image memory to plot the polygon, comprising:
   (a) storing means having registers for storing data of the vertexes of the polygon;
   (b) stack means for storing data of the vertexes of polygons;
   (c) decision means for determining whether or not the polygon stored in the storage means is smaller than a predetermined size;
   (d) plotting means for writing pixels corresponding to the polygon to the image memory if said decision means determines that the polygon is smaller than the predetermined size; and
   (e) division means for dividing the polygon into small polygons if said decision means determines that the polygon is not smaller than the predetermined size, writing data of the vertexes of one of the small polygons to the registers of said storage means, and writing data of the vertexes of the other small polygons to said stack means,
   wherein the three-dimensional polygon is also defined by a depth of each vertex thereof, and said division means defines the coordinates of each vertex of each small polygon by averaging the depths of vertexes at both ends of each edge of the polygon to be divided into the small polygons.

3. A graphics plotting apparatus for writing a three-dimensional polygon defined by vertexes to an image memory to plot the polygon, comprising:
   (a) storing means having registers for storing data of the vertexes of the polygon;
   (b) stack means for storing data of the vertexes of polygons;
   (c) decision means for determining whether or not the polygon stored in the storage means is smaller than a predetermined size;
   (d) plotting means for writing pixels corresponding to the polygon to the image memory if said decision means determines that the polygon is smaller than the predetermined size; and
   (e) division means for dividing the polygon into small polygons if said decision means determines that the polygon is not smaller than the predetermined size, writing data of the vertexes of one of the small polygons to the registers of said storage means, and writing data of the vertexes of the other small polygons to said stack means,
   wherein the three-dimensional polygon is also defined by a luminance of each vertex thereof, and said division means determines the luminance of each vertex of each small polygon by averaging the luminance of vertexes at both ends of each edge of the polygon to be divided into the small polygons.

4. A graphics plotting apparatus for writing a three-dimensional polygon defined by vertexes to an image memory to plot the polygon, comprising:
   (a) registers for storing data of the vertexes of the polygon;
   (b) edge dividers connected to the registers for dividing the polygon into small polygons;
   (c) a decision unit connected to the registers and the edge dividers for determining whether or not the polygon stored in the registers is smaller than a predetermined size;
   (d) a stack connected to the registers, the edge dividers and the decision unit for storing data of the vertexes of polygons;
   (e) an adder connected to the edge dividers, the registers and the stack for averaging data by the edge dividers; and
   (f) a plotting unit connected to the decision unit for writing pixels corresponding to the polygon to the image memory if the decision unit determines that the polygon is smaller than the predetermined size,
   wherein the three-dimensional polygon is also defined by a depth of each vertex thereof, and said edge dividers divide the polygon into small polygons according to a ratio of the depth of a vertex at one end to the depth of a vertex at the other end of each edge of the polygon.

5. A graphics plotting apparatus for writing a three-dimensional polygon defined by vertexes to an image memory to plot the polygon, comprising:

(a) registers for storing data of the vertexes of the polygon;

(b) edge dividers connected to the registers for dividing the polygon into small polygons;

(c) a decision unit connected to the registers and the edge dividers for determining whether or not the polygon stored in the registers is smaller than a predetermined size;

(d) a stack connected to the registers, the edge dividers and the decision unit for storing data of the vertexes of polygons;

(e) an adder connected to the edge dividers, the registers and the stack for averaging data by the edge dividers; and (f) a plotting unit connected to the decision unit for writing pixels corresponding to the polygon to the image memory if the decision unit determines that the polygon is smaller than the predetermined size, wherein the three-dimensional polygon is also defined by a depth of each vertex thereof, and said edge dividers define the coordinates of each vertex of each small polygon by averaging the depths of vertexes at both ends of each edge of the polygon to be divided into the small polygons.

6. A graphics plotting apparatus for writing a three-dimensional polygon defined by vertexes to an image memory to plot the polygon, comprising:

(a) registers for storing data of the vertexes of the polygon;

(b) edge dividers connected to the registers for dividing the polygon into small polygons;

(c) a decision unit connected to the registers and the edge dividers for determining whether or not the polygon stored in the registers is smaller than a predetermined size;

(d) a stack connected to the registers, the edge dividers and the decision unit for storing data of the vertexes of polygons;

(e) an adder connected to the edge dividers, the registers and the stack for averaging data by the edge dividers; and (f) a plotting unit connected to the decision unit for writing pixels corresponding to the polygon to the image memory if the decision unit determines that the polygon is smaller than the predetermined size, wherein the three-dimensional polygon is also defined by a luminance of each vertex thereof, and said edge dividers determine the luminance of each vertex of each small polygon by averaging the luminance of vertexes at both ends of each edge of the polygon to be divided into the small polygons.

* * * * *